=

US007720983B2

(12) United States Patent
Klemets et al.

(10) Patent No.: US 7,720,983 B2
(45) Date of Patent: May 18, 2010

(54) FAST STARTUP FOR STREAMING MEDIA

(75) Inventors: Anders E. Klemets, Redmond, WA (US); Eduardo P. Oliveira, Redmond, WA (US); Sanjay Bhatt, Redmond, WA (US); Tong L. Wynn, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1313 days.

(21) Appl. No.: 10/838,465

(22) Filed: May 3, 2004

(65) Prior Publication Data
US 2005/0262251 A1 Nov. 24, 2005

(51) Int. Cl.
*G06F 15/16* (2006.01)
(52) U.S. Cl. .................. 709/231; 709/224; 709/225; 709/230; 370/231; 370/395.2; 725/1; 725/86; 725/95
(58) Field of Classification Search .............. 709/224, 709/225, 230, 231
See application file for complete search history.

(56) References Cited

U.S. PATENT DOCUMENTS

| 5,675,741 | A  | * | 10/1997 | Aggarwal et al. | 709/242 |
| 5,913,039 | A  |   | 6/1999  | Nakamura et al. |         |
| 5,999,979 | A  | * | 12/1999 | Vellanki et al. | 709/232 |
| 6,078,594 | A  | * | 6/2000  | Anderson et al. | 370/498 |
| 6,195,680 | B1 | * | 2/2001  | Goldszmidt et al. | 709/203 |
| 6,594,699 | B1 | * | 7/2003  | Sahai et al. | 709/228 |
| 6,601,094 | B1 | * | 7/2003  | Mentze et al. | 709/220 |
| 6,662,223 | B1 | * | 12/2003 | Zhang et al. | 709/224 |
| 6,754,715 | B1 |   | 6/2004  | Cannon et al. |         |
| 6,772,216 | B1 | * | 8/2004  | Ankireddipally et al. | 709/230 |
| 7,010,492 | B1 | * | 3/2006  | Bassett et al. | 705/1 |
| 7,093,754 | B2 | * | 8/2006  | Sako | 235/385 |
| 7,103,668 | B1 | * | 9/2006  | Corley et al. | 709/231 |
| 7,184,433 | B1 | * | 2/2007  | Oz | 370/389 |
| 7,277,915 | B2 | * | 10/2007 | de Boor et al. | 709/203 |
| 7,293,066 | B1 | * | 11/2007 | Day | 709/213 |
| 7,299,489 | B1 | * | 11/2007 | Branigan et al. | 726/2 |
| 7,424,528 | B2 | * | 9/2008  | Cherkasova et al. | 709/224 |

(Continued)

FOREIGN PATENT DOCUMENTS

CN 1292532 4/2001

(Continued)

OTHER PUBLICATIONS

Fielding et al.; rfc2068 Hpyertext Transfer Protocol—HTTP/1.1; Jan. 1997; pp. 1-145.

(Continued)

*Primary Examiner*—Hassan Phillips
*Assistant Examiner*—Backhean Tiv
(74) *Attorney, Agent, or Firm*—Lee & Hayes, PLLC

(57) ABSTRACT

Fast startup for streaming media includes one or both of a technique for predictive start and a technique for switching delivery channel(s) during streaming. Predictive start allows a media content source to predict which media stream(s) are desired by the requesting client device and begin streaming those predicted media stream(s) to the client device. The delivery channel switching technique allows the media content source to begin streaming the media stream(s) using one delivery channel (e.g., using the Transmission Control Protocol (TCP)), and then check whether another delivery channel (e.g., using the User Datagram Protocol (UDP)) will work and switch to that other delivery channel if it will work.

38 Claims, 7 Drawing Sheets

U.S. PATENT DOCUMENTS

| | | | |
|---|---|---|---|
| 7,454,527 B2* | 11/2008 | Zhang et al. | 709/249 |
| 7,571,232 B2* | 8/2009 | Zigmond et al. | 709/227 |
| 7,577,140 B2* | 8/2009 | Curtis | 370/390 |
| 2001/0030944 A1* | 10/2001 | Kato | 370/237 |
| 2002/0010917 A1* | 1/2002 | Srikantan et al. | 725/1 |
| 2002/0044553 A1* | 4/2002 | Chakravorty | 370/392 |
| 2002/0056126 A1* | 5/2002 | Srikantan et al. | 725/87 |
| 2002/0072817 A1* | 6/2002 | Champion | 700/94 |
| 2002/0080768 A1* | 6/2002 | Garcia-Luna-Aceves et al. | 370/349 |
| 2002/0099844 A1* | 7/2002 | Baumann et al. | 709/232 |
| 2002/0116529 A1* | 8/2002 | Hayden | 709/245 |
| 2002/0133247 A1 | 9/2002 | Smith et al. | |
| 2002/0136298 A1* | 9/2002 | Anantharamu et al. | 375/240.12 |
| 2002/0138549 A1 | 9/2002 | Urien | |
| 2002/0144276 A1* | 10/2002 | Radford et al. | 725/87 |
| 2003/0010819 A1* | 1/2003 | Sako | 235/379 |
| 2003/0028591 A1* | 2/2003 | Goloshubin et al. | 709/203 |
| 2003/0053427 A1* | 3/2003 | Kanda et al. | 370/328 |
| 2003/0061304 A1* | 3/2003 | Tenereillo et al. | 709/217 |
| 2003/0065718 A1 | 4/2003 | Nagasaka | |
| 2003/0086404 A1* | 5/2003 | Beckmann et al. | 370/338 |
| 2003/0182437 A1* | 9/2003 | Kobayashi et al. | 709/232 |
| 2004/0030791 A1* | 2/2004 | Dorenbosch et al. | 709/230 |
| 2004/0093406 A1* | 5/2004 | Thomas et al. | 709/224 |
| 2004/0111523 A1* | 6/2004 | Hall et al. | 709/230 |
| 2004/0247295 A1* | 12/2004 | Nam et al. | 386/95 |
| 2004/0252701 A1 | 12/2004 | Anandakumar | |
| 2004/0267937 A1 | 12/2004 | Klemets | |
| 2005/0002337 A1* | 1/2005 | Wang et al. | 370/235 |
| 2005/0013310 A1* | 1/2005 | Banker et al. | 370/401 |
| 2005/0047340 A1* | 3/2005 | Babiarz et al. | 370/231 |
| 2005/0076099 A1* | 4/2005 | Wang et al. | 709/219 |
| 2005/0086355 A1* | 4/2005 | Deshpande | 709/231 |
| 2005/0102371 A1* | 5/2005 | Aksu | 709/217 |
| 2005/0113086 A1* | 5/2005 | Wilson | 455/432.2 |
| 2005/0114324 A1* | 5/2005 | Mayer | 707/3 |
| 2005/0135248 A1* | 6/2005 | Ahuja et al. | 370/235 |
| 2005/0149975 A1* | 7/2005 | Jutzi | 725/95 |
| 2005/0165849 A1* | 7/2005 | Moradi et al. | 707/104.1 |
| 2005/0262251 A1* | 11/2005 | Klemets et al. | 709/230 |
| 2006/0041917 A1* | 2/2006 | Vellanki et al. | 725/86 |
| 2006/0092269 A1* | 5/2006 | Baird et al. | 348/14.08 |
| 2006/0092888 A1* | 5/2006 | Jeong et al. | 370/338 |
| 2006/0206617 A1* | 9/2006 | Rey et al. | 709/231 |
| 2006/0244839 A1* | 11/2006 | Glatron et al. | 348/211.11 |
| 2007/0005690 A1* | 1/2007 | Corley et al. | 709/203 |
| 2007/0204049 A1* | 8/2007 | Herrod | 709/227 |

FOREIGN PATENT DOCUMENTS

| | | |
|---|---|---|
| RU | 2222115 C2 | 1/2004 |

OTHER PUBLICATIONS

Handley et al.; rfc2327 "SDP Session Description Protocol"; Apr. 1998; pp. 1-38.

Krasic et al.; "The Case for Streaming Multimedia with TCP," Lecture Notes in Computer Science; vol. 2158, Sep. 4, 2001; pp. 213-218.

Lee et al.; rfc1945 Hypertext Transfer Protocol—HTTP/1.0; May 1996; pp. 1-54.

Rogers et al.; "Mising UDP and TCP in a Diffserv Assured Forwarding PHB—A Programmable Networks Scenario"; Ninth IEEE International Conference on Networks, Oct. 10, 2001; pp. 529-534.

Rosenberg et al.; "rfc3489"; Mar. 2003, STUN—Simple Traversal of user Datagram Protocol (UDP) Through Network Address Translators (NATS); pp. 1-42.

Schlzrinne et al.; rfc3550 RTP: A Transport Protocol for Real-Time Applications; Jul. 2003; pp. 1-93.

Schulzrinne et al.; rfc2326 Real Time Streaming Protocol (RTSP); Apr. 1998; pp. 1-82.

Westerlund, Magnus et al, "How to Enable Real-Time Streaming Protocol (RTSP) traverse network Address Translators (NAT) and interact with Firewalls", PacketVideo Network Solutions, Feb. 16, 2004, 27 pages.

Russian Decision on Grant a Patent for Invention for Russian Patent Application No. 2005120654 mailed on Nov. 17, 2008, 24 pgs.

First Ofice Action for Chinese Patent Application No. 200480012358.0, mailed May 9, 2008 (9 pages).

* cited by examiner

FAST STARTUP FOR STREAMING MEDIA

TECHNICAL FIELD

This invention relates to streaming media and data transfers, and particularly to fast startup for streaming media.

BACKGROUND

Content streaming, such as the streaming of audio, video, and/or text is becoming increasingly popular. The term "streaming" is typically used to indicate that the data representing the media is provided over a network to a client computer on an as-needed basis rather than being pre-delivered in its entirety before playback. Thus, the client computer renders streaming content as it is received from a network server, rather than waiting for an entire "file" to be delivered.

The widespread availability of streaming multimedia content enables a variety of informational content that was not previously available over the Internet or other computer networks. Live content is one significant example of such content. Using streaming multimedia, audio, video, or audio/visual coverage of noteworthy events can be broadcast over the Internet as the events unfold. Similarly, television and radio stations can transmit their live content over the Internet.

Current streaming technology, however, has its drawbacks. One such drawback is that there is typically a somewhat lengthy delay between the time that a playback of streaming media is requested and the time when the playback of the streaming media begins. Various communications are typically required between the client device where the playback of the media content will occur and the source of the media content. From the perspective of the user of the client device, such delays reduce the user-friendliness of the client device as well as the user-friendliness of the streaming process. Thus, it would be beneficial to reduce the delay between the time the user requests playback of streaming media and the time when the playback of the streaming media begins.

SUMMARY

Fast startup for streaming media is described herein. The fast startup for streaming media includes one or both of a technique for predictive start and a technique for switching delivery channel(s) during streaming.

In accordance with certain aspects, the technique for predictive start comprises a client device sending a predictive play request to a server device. In response to the predictive play request, the server device predicts one or more media streams desired by the client device and streams the predicted one or more media streams to the client device. The client device can select at least one media stream different from the predicted one or more media streams for streaming to the client device. If at least one such media stream is selected, then an indication of the selected at least one media stream is sent to the server device, and the server device streams the selected at least one media stream to the client device.

In accordance with certain aspects, the technique for switching delivery channel(s) during streaming includes a client device sending a request to a server device that one or more media streams be streamed to the client device. The server device receives the request and begins streaming the one or more media streams to the client device using TCP (Transmission Control Protocol). While streaming the one or more media streams from the server device to the client device using TCP, probing is performed to determine whether data can be streamed from the server device to the client device using UDP (User Datagram Protocol). If the probing indicates that data can be streamed from the server device to the client device using UDP, then the streaming of the one or more media streams is switched from using TCP to using UDP. However, if the probing indicates that data cannot be streamed from the server device to the client device using UDP, then the streaming of the one or more media streams continues using TCP.

BRIEF DESCRIPTION OF THE DRAWINGS

The same numbers are used throughout the document to reference like components and/or features.

DETAILED DESCRIPTION

Fast startup for streaming media is described herein. The fast startup includes one or both of a technique for predictive start and a technique for switching delivery channel(s) during streaming. Predictive start allows a media content source to predict which media stream(s) are desired by the requesting client device and begin streaming those predicted media stream(s) to the client device. The delivery channel switching technique allows the media content source to begin streaming the media stream(s) using one delivery channel (e.g., using the Transmission Control Protocol (TCP)), and then check whether another delivery channel (e.g., using the User Datagram Protocol (UDP)) will work and switch to that other delivery channel if it will work.

Figure 1:
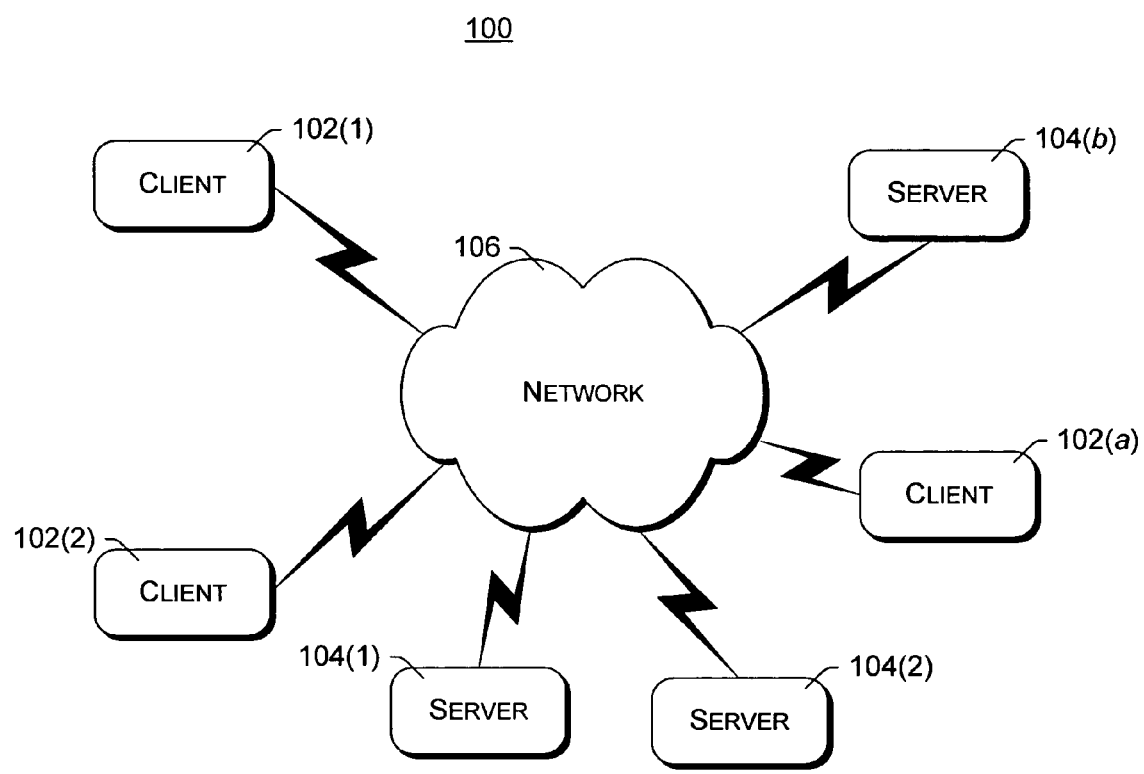
FIG. 1 illustrates an example network environment that supports the fast startup for streaming media described herein.

FIG. 1 illustrates an example network environment 100 that supports the fast startup for streaming media described herein. In environment 100, multiple (a) client computing devices 102(1), 102(2), . . . , 102(a) are coupled to multiple (b) server computing devices 104(1), 104(2), . . . , 104(b) via a network 106. Network 106 is intended to represent any of a variety of conventional network topologies and types (including wired and/or wireless networks), employing any of a variety of conventional network protocols (including public and/or proprietary protocols). Network 106 may include, for example, the Internet as well as possibly at least portions of one or more local area networks (LANs).

Computing devices 102 and 104 can each be any of a variety of conventional computing devices, including desktop PCs, workstations, mainframe computers, Internet appliances, gaming consoles, handheld PCs, cellular telephones, personal digital assistants (PDAs), etc. One or more of devices 102 and 104 can be the same types of devices, or alternatively different types of devices.

Server devices 104 can make any of a variety of data available for streaming to clients 102. The term "streaming" is used to indicate that the data representing the media is provided over a network to a client device and that playback of the content can begin prior to the content being delivered in its entirety (e.g., providing the data on an as-needed basis rather than pre-delivering the data in its entirety before playback). The data may be publicly available or alternatively restricted (e.g., restricted to only certain users, available only if the appropriate fee is paid, etc.). The data may be any of a variety of one or more types of content, such as audio, video, text, animation, etc. Additionally, the data may be pre-recorded or alternatively "live" (e.g., a digital representation of a concert being captured as the concert is performed and made available for streaming shortly after capture).

A client device 102 may receive streaming media from a server 104 that stores the streaming media content as a file, or alternatively from a server 104 that receives the streaming media from some other source. For example, server 104 may receive the streaming media from another server that stores the streaming media content as a file, or may receive the streaming media from some other source (e.g., an encoder that is encoding a "live" event).

As used herein, streaming media refers to streaming one or more media streams from one device to another (e.g., from a server device 104 to a client device 102). The media streams can include any of a variety of types of content, such as one or more of audio, video, text, and so forth.

Figure 2:
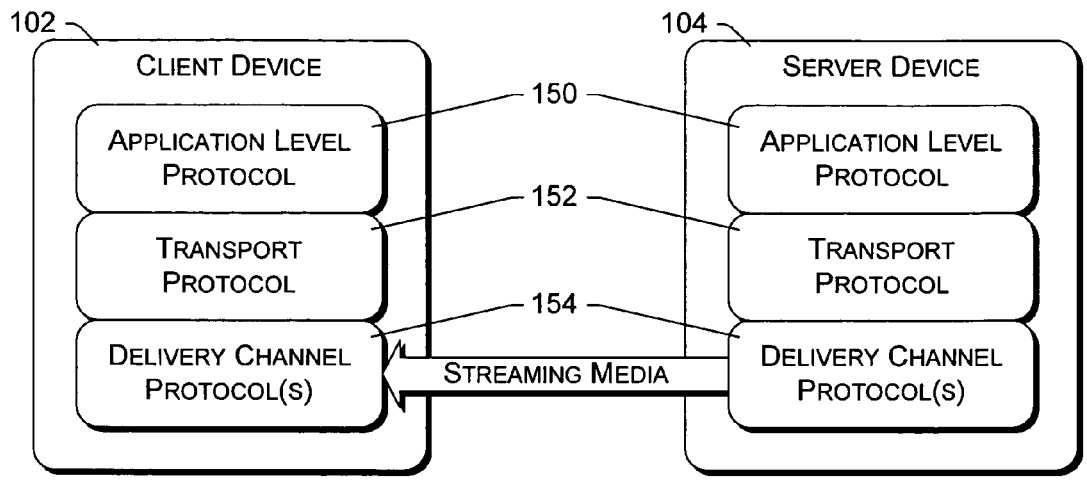
FIG. 2 illustrates example client and server devices that can stream media content using the fast startup for streaming media described herein.

FIG. 2 illustrates example client and server devices that can stream media content using the fast startup for streaming media described herein. Multiple different protocols are typically followed at both client device 102 and server device 104 in order to stream media content from server device 104 to client device 102. These different protocols can be responsible for different aspects of the streaming process. Although not shown in FIG. 2, one or more additional devices (e.g., firewalls, routers, gateways, bridges, etc.) may be situated between client device 102 and server device 104.

In the example of FIG. 2, an application level protocol 150, a transport protocol 152, and one or more delivery channel protocols 154 are used as part of the streaming process. Additional protocols not shown in FIG. 2 may also be employed (e.g., there may be an additional protocol(s) between application level protocol 150 and transport protocol 152). Application level protocol 150 is a protocol at the application level for control of the delivery of data with real-time properties. Application level protocol 150 provides a framework, optionally extensible, to enable controlled, on-demand delivery of real-time data, such as streaming audio and video content. Application level protocol 150 is a control protocol for initiating and directing delivery of streaming multimedia from media servers. Examples of application level protocol 150 include the Real-Time Streaming Protocol (RTSP) as described in Network Working Group Request for Comments (RFC) 2326, April 1998, and the HyperText Transport Protocol (HTTP) as described in Network Working Group Request for Comments (RFC) 1945, May 1996 or Network Working Group Request for Comments (RFC) 2068, January 1997.

Application level protocol 150 uses transport protocol 152 for the delivery of real-time data, such as streaming audio and video. Transport protocol 152 defines a packet format for media streams. Transport protocol 152 provides end-to-end network transport functions suitable for applications transmitting real-time data, such as audio, video or simulation data, over multicast or unicast network services. Examples of transport protocol 152 include the Realtime Transport Protocol (RTP) and the Realtime Control Protocol (RTCP) as described in Network Working Group Request for Comments (RFC) 3550, July 2003. RTP does not address resource reservation and does not guarantee quality-of-service for real-time services. The data transport is augmented by a control protocol (RTCP) to allow monitoring of the data delivery in a manner scalable to large multicast networks, and to provide some control and identification functionality.

The transport protocol 152 uses delivery channel protocol(s) 154 for the transport connections. Delivery channel protocol(s) 154 include one or more channels for transporting packets of data from server device 104 to client device 102. Each channel is typically used to send data packets for a single media stream, although in alternate embodiments a single channel may be used to send data packets for multiple media streams. Examples of delivery channel protocols 154 include Transmission Control Protocol (TCP) packets and User Datagram Protocol (UDP) packets. TCP ensures the delivery of data packets, whereas UDP does not ensure the delivery of data packets. Typically, delivery of data packets using TCP is more reliable, but also more time-consuming, than delivery of data packets using UDP.

Figure 3:
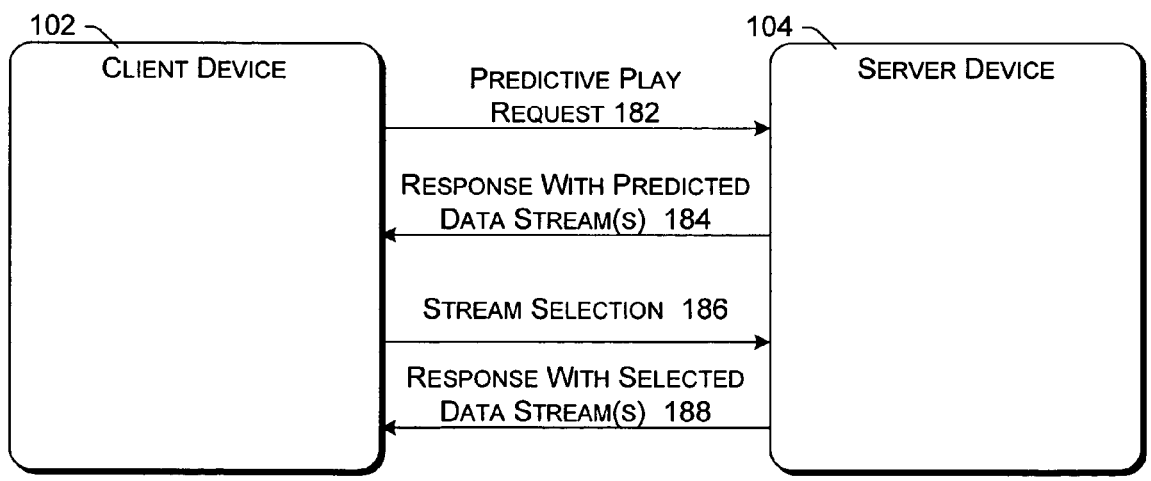
FIG. 3 is a block diagram illustrating example client and server devices and the predictive start technique in additional detail.

FIG. 3 is a block diagram illustrating example client and server devices and the predictive start technique in additional detail. In certain embodiments, the protocols 150, 152, and 154 of FIG. 2 are included in the client and server devices of FIG. 3, but have not been illustrated. Furthermore, although not shown in FIG. 3, one or more additional devices (e.g., firewalls, routers, gateways, bridges, etc.) may be situated between client device 102 and server device 104.

Client device 102 initiates the predictive start process by sending a predictive play request 182 to server device 104. Predictive play request 182 can include various information to assist server device 104 in predicting which media streams client device 102 desires. This information can include, for example, information about client device 102, information about a user(s) of client device 102, and/or information about the connection between server device 104 and client device 102. Server device 104 receives the predictive play request and predicts which media stream(s) client device 102 desires. This prediction is typically based at least in part on the information included in the predictive play request.

Server device 104 then begins to stream 184 the media stream(s) it predicted that client device 102 desires to client device 102. Thus, in the illustrated example of FIG. 3, streaming of the media content from server device 104 to client device 102 begins in response to the first request from client device 102 received at server device 104. As part of the streaming of the predicted stream(s) 184, server device 104 includes a description of the various media streams that are available to client device 102. These various media streams will typically include the streams predicted by server device 104 as well as one or more additional streams.

Client device 102 receives the streaming media from server device 104 and processes the streaming media. This processing can include, for example, buffering of the streaming media for presentation to a user at client device 102. Additionally, client device 102 checks the description, received form server device 104, of the various media streams that are available to client device 102, and determines whether the predicted streams currently being streamed to client device 102 are indeed the streams desired by client device 102. If they are the desired streams, then no further action need be taken by client device 102. However, if they are not the desired streams, then client device 102 sends a stream selection 186 to server device 104. Stream selection 186 identifies the streams desired by client device 102.

Server device 104 receives stream selection 186 and streams the selected stream(s) 188 to client device 102. Stream selection 186 may identify one or more streams, and may identify a stream that is to replace a predicted stream or that is to be streamed in addition to a predicted stream. If an identified stream is to replace a predicted stream, then streaming of that predicted stream is stopped by server device 104. However, if an identified stream is to be in addition to a predicted stream, then streaming of that predicted stream is not stopped by server device 104.

Example embodiments of the predictive play request 182, response with predicted data stream(s) 184, stream selection 186, and response with selected data stream(s) 188 are discussed in additional detail in the following paragraphs.

Predictive play request 182 includes a resource locator, such as a uniform resource locator (URL). This resource locator identifies the media content that is desired by client device 102. However, there may be various options for that media content. For example, the media content may have multiple video streams encoded at different bit rates (for client devices having different connection speeds), multiple video streams for different languages, multiple audio streams for different languages, multiple sub-title media streams in different languages, and so forth. However, because client device 102 does not yet know what those various options are, client device 102 cannot yet select particular ones of the different available options for the media content.

Predictive play request 182 can also include one or more name-value pairs that include information used by server device 104 in predicting which media stream(s) are desired by client device 102. These name-value pairs include a name portion that indicates the type of information being identified, and a value portion that indicates the particular information being identified. Alternatively, the information may be identified in manners other than name-value pairs, such as a series of values that appear in a pre-defined order (thereby alleviating the need for the name portion). Additionally, in some situations predictive play request 182 may not include any such information, in name-value pairs or otherwise.

The information included in play request 182 can vary. In certain embodiments, play request 182 includes an identification of the connection speed or link bandwidth between client device 102 and server device 104, and also an identification of a language desired by client device 102. In other embodiments, other information may be included in addition to or in place of the link bandwidth and/or language, such as what types of media streams are desired (e.g., audio only, video only, video and audio, etc.), what codecs (e.g., audio codecs, video codecs, etc.) are available on client device 102, what language the video data should be in (e.g., so people's lips on the video are synchronized with the audio), and so forth.

Client device 102 can obtain the information to be included in predictive play request 182 in different manners. Typically, the resource locator is obtained by user-input (e.g., user-selection of particular media content) or by program-input (e.g., a program running on client device 102 selects particular media content). The information that is used by server device 104 in making its prediction may be pre-programmed (e.g., by a developer or designer, or by user-setting of preferences) into the application that is sending predictive play request 182. For example, if the application is a media player application, a user of the media player application may be able to set a preference or option of the media player application to identify the language that the user prefers. Information about connection speed or link bandwidth may be obtained, for example, by an application on client device 102 testing the bandwidth, based on a user-input of the available bandwidth, by monitoring the rate at which media was previously streamed to client device 102, and so forth. The information that is used by server device 104 in making its prediction may alternatively be pre-programmed into server device 104 as well (e.g., in situations where all clients are known or expected to be of the same type).

Predictive play request 182 can take a variety of different forms. In certain embodiments, predictive play request 182 is an HTTP get command. Alternatively, other formats can be used (e.g., different syntaxes, an HTTP post command, an RTSP command, and so forth). The predictive play request includes an identifier that identifies the request as a predictive play request. In certain embodiments, one or more headers are used to identify a request as a predictive play request, although the information identifying the request as a predictive play request could alternatively be included in the message body. Additionally, in certain implementations, the presence of one or more such headers in the request identifies the request as a predictive play request. An example of a predictive start header that can be used to identify a request as a predictive play request is "Pragma: PredStart=1", with the value "1" being used as a parameter to indicate that predictive play is being requested.

When server device 104 receives predictive play request 182, server device 104 identifies the media streams associated with request 182. Request 182 identifies a resource that may be one or more files that each include one or more media streams that can be streamed to client device 102. Associated with the resource is an identification of these media stream(s), and typically information describing what these media streams are (e.g., a bit rate that they are encoded in; whether they are audio, video, text, etc.; what language they are in; etc.). This identification can be part of the resource (e.g., it may be in a header file of the resource, such as an ASF (Advanced Streaming Format or Advanced Systems Format) header in an ASF file), or may alternatively be maintained separately. Server device 104 uses the information included in predictive play request 182, as well as the information regarding what media stream(s) are available for the requested resource, to predict which media stream(s) are desired by client device 102. Server device 104 may also employ additional information, such as default values that are supplied by an administrator or user of server device 104, media stream(s) previously streamed to other client devices 102 (and/or to this client device 104), and so forth. The exact manner in which the stream(s) desired by client device 102 are predicted can vary based on the information available to server device 104.

By way of example, assume that client device 102 sends a predictive play request for a movie to be streamed to client device 102. Client device 102 does not know what media stream(s) are available for that movie, such as what different bit rates the video content has been encoded in, what languages the audio content is available in, what languages sub-titles are available in, and so forth. However, assume that client device 102 does know that its default language is English and that it has a connection speed of 500 kilobits per second (kbps). So, client device 102 sends a predictive play request for the movie to server device 104, and includes in the predictive play request an indication that its default language is English and that its default connection speed is 500 kbps.

Server device 104 receives the predictive play request and accesses the information associated with the requested movie that describes the requested movie. Assume that the movie has three video streams, one encoded at 100 kbps, another at 300 kbps, and another at 500 kbps. Further assume that the movie has an audio stream in English encoded at 100 kbps, and an audio stream encoded in Spanish at 100 kbps, and further that the movie has a sub-title stream in French encoded at 10 kbps, and a sub-title stream in Japanese encoded at 10 kbps. Also assume that the information associated with the movie indicates that the video streams are mutually exclusive (only one of the three can be streamed at a time to client device 102), that the audio streams are mutually exclusive (only one of the two can be streamed at a time to client device 102), and that audio is to have priority over video.

Since audio is to have priority over video, server device 104 will stream one of the two audio streams to client device 102. Further, since the predictive play request includes an indication that the default language of client device 102 is English, server device 104 predicts that client device 102 desires the English audio stream.

Given that the English audio stream is encoded at 100 kbps, and the default connection speed for client device 102 is 500 kbps, server device 104 predicts that client device 102 desires the video stream encoded at 300 kbps (since the audio stream is encoded at 100 kbps, server device 104 predicts that there is insufficient bandwidth to stream the 500 kbps stream).

The predictive play request does not include any information about subtitle streams, so server device 104 looks elsewhere to determine whether to predict that a subtitle stream is desired. Since there is leftover bandwidth (only 400 kbps of the 500 kbps have been used), server device 104 may predict that one of the subtitle streams is desired. If one of the subtitle streams is identified in the information associated with the movie as having priority over the other, then that subtitle stream is predicted as being the one desired by client device 102. Otherwise, one of the subtitle streams is predicted as being the one desired by client device 102 in some other way (e.g., randomly, in the order they are referenced in the information associated with the movie, etc.).

Alternatively, server device 104 may keep a record of how frequently the various media streams are desired by client devices. If this record indicates the subtitle streams are infrequently desired by client devices (e.g., less than 50% of the time), then server device 104 may predict that no subtitle stream is desired by client device 102 and stream no subtitle stream to client device 102.

It should be noted that the media stream(s) predicted by server device 104 as being desired by client device 102 are just that: predictions. There is no guarantee that these media stream(s) are indeed the media stream(s) desired by client device 102. However, by making the prediction, server device 104 can immediately begin streaming the media stream(s) to client device 102, without having to wait for client device 102 to make a selection of which media streams it desires.

Server device 104 then streams the predicted media stream(s) to client device 102. Server device 104 also communicates information including an identification of what media streams are available for the requested resource, as well as what streams were predicted as being desired by client device 102. The information can be included with the predicted media stream(s) and thus streamed to client device 102, or alternatively may be communicated in some other manner, such as in a non-streaming manner (e.g., through an HTTP-based control protocol). In certain embodiments, this information is included in a session description message in accordance with the Session Description Protocol (SDP), Network Working Group Request for Comments (RFC) 2327, April 1998.

Client device 102 receives the predicted media streams, including the identification of what media streams are available for the requested resource, as well as what streams were predicted as being desired by client device 102. Client device 102 can then analyze the identification of what media streams are available for the requested resource and select a different media stream than the predicted media streams. The selection of a different stream is optional—if client device 102 desires the media streams predicted by server device 104, then no selection of other media streams need be made by client device 102.

The selected media stream may be in addition to the predicted media streams (e.g., in the preceding example, no subtitle stream may be predicted by server device 104 as being desired by client device 102, but client device 102 may select a subtitle stream). The selected media stream may alternatively be in place of a predicted media stream (e.g., the client device 102 may select the Spanish audio stream rather than the English audio stream).

The selection at client device 102 can be performed in different manners. For example, an application (e.g., a media player application) may be programmed to make the selection. By way of another example, the various media streams available may be presented to a user of the client device and the user may be allowed to select which media stream(s) he or she desires. Any selection made by client device 102 is then sent to server device 104.

In certain embodiments, such as when using HTTP for streaming the media, an identifier of the streaming session is used. The identifier allows different requests to be associated with one another. For example, the predictive play request may be sent over one connection between the client device 102 and the server device 104, while the request that identifies the selected media streams is sent over a different connection between the client device 102 and the server device 104. In order for the server device 104 to know that the two requests are related to one another, the identifier of the streaming session is used. In certain embodiments, server device 104 returns, in the response to the predictive play request, an identifier. This identifier can then be used by client device 102 when sending a request that identifies the selected media streams to server device 104 in order to inform server device 104 that the request identifying the selected media streams is associated with the predictive play request.

The request that identifies the selected media streams can be in any of a variety of different formats. In certain embodiments, the request is a Select request which can be sent, for example, as an HTTP Post command or HTTP Get command to server device 104. Alternatively, the request can be delivered in other manners, such as using an RTSP command. The Select request includes an identifier that identifies the request as a Select request, zero or more headers, and optionally a message body. In certain embodiments, the information identifying the selected media streams is included in one or more headers of the Select request, although the information identifying the selected media streams could alternatively be included in the message body. Additionally, in certain implementations, the presence of one or more such headers in the request identify the request as a Select request. Table I illustrates an example of headers that can be included in the Select request.

TABLE I

| Header Name | Description |
| --- | --- |
| Pragma: client-id | An identifier of the streaming media session. Allows the client device to indicate that the Select request is associated with a particular streaming session. |
| Pragma: stream-switch-entry | An identification of the media streams selected by the client device. The individual media streams that are available for the requested resource (e.g., as identified by the server device in the session description message) are assigned identifiers (which are typically included in the session description message). A list of one or more of these identifiers is included as parameters of this stream-switch-entry header. |

The information describing the selected media streams can describe the selected media streams in different ways. As part of the description of the selected media streams, a "thinning level" may be included that indicates how much of the data of the media stream is to be streamed to client device 102 (e.g., all frames, only key frames, etc.). As an example, the description may be a list of the media stream(s) desired by client device 102, without regard for which streams were predicted by server device 104. By way of another example, the description may be a list of the media stream(s) desired by client device 102 that are in addition to the streams that were predicted by server device 104. By way of yet another example, the description may include one or more stream pair values, each pair identifying a predicted stream and a selected stream that is to replace the predicted stream. By way of yet another example, the description may be a list of all of the media stream(s) and an identification of whether the media stream has been selected for streaming to client device 102. By way of still another example, the description may be a "negative" description (e.g., listing all of the media stream(s) that the client device 102 does not desire, and thus inherently identifying the media stream(s) that the client device 102 does desire).

Server device 104 receives the Select request and begins streaming the selected streams to client device 102. Server device 104 stops streaming to client device 102 any predicted stream(s) that were replaced by a selected stream, but continues to stream any predicted stream(s) that was not replaced by a selected stream.

The resource identified by a predictive play request can be associated with a single media or multimedia presentation, or alternatively multiple such presentations. For example, the resource may identify a movie, which is a single multimedia presentation even though it may have multiple video, audio, and/or subtitle streams. By way of another example, the resource may identify a movie as well as a commercial and a trailer for a different movie. In this example, the movie would be one multimedia presentation, the commercial a second multimedia presentation, and the trailer a third multimedia presentation.

When a resource is associated with multiple multimedia presentations, server device 104 can predict which presentations are desired by client device 102, as well as predict which media streams within those presentations are desired by client device 102. For example, assume that there are two different commercials associated with a resource, one commercial targeting a Hispanic audience and the other targeting a Chinese audience. If the predictive play request indicates that the default language is Spanish, then server device 104 can predict that the commercial targeting the Hispanic audience is desired by client device 102 rather than the commercial targeting the Chinese audience.

It should be noted that, in some situations, server device 104 may choose to not make a prediction. Such situations can arise, for example, when the likelihood of making an incorrect prediction is too great. In such situations, server device 104 sends the identification of what media streams are available for the requested resource but does not start streaming any predicted media stream(s). Rather, server device 104 waits until client device has made a selection of one or more of the available media streams, and starts streaming the selected media stream(s) when a request to play the selected media stream(s) is received.

Figure 4:
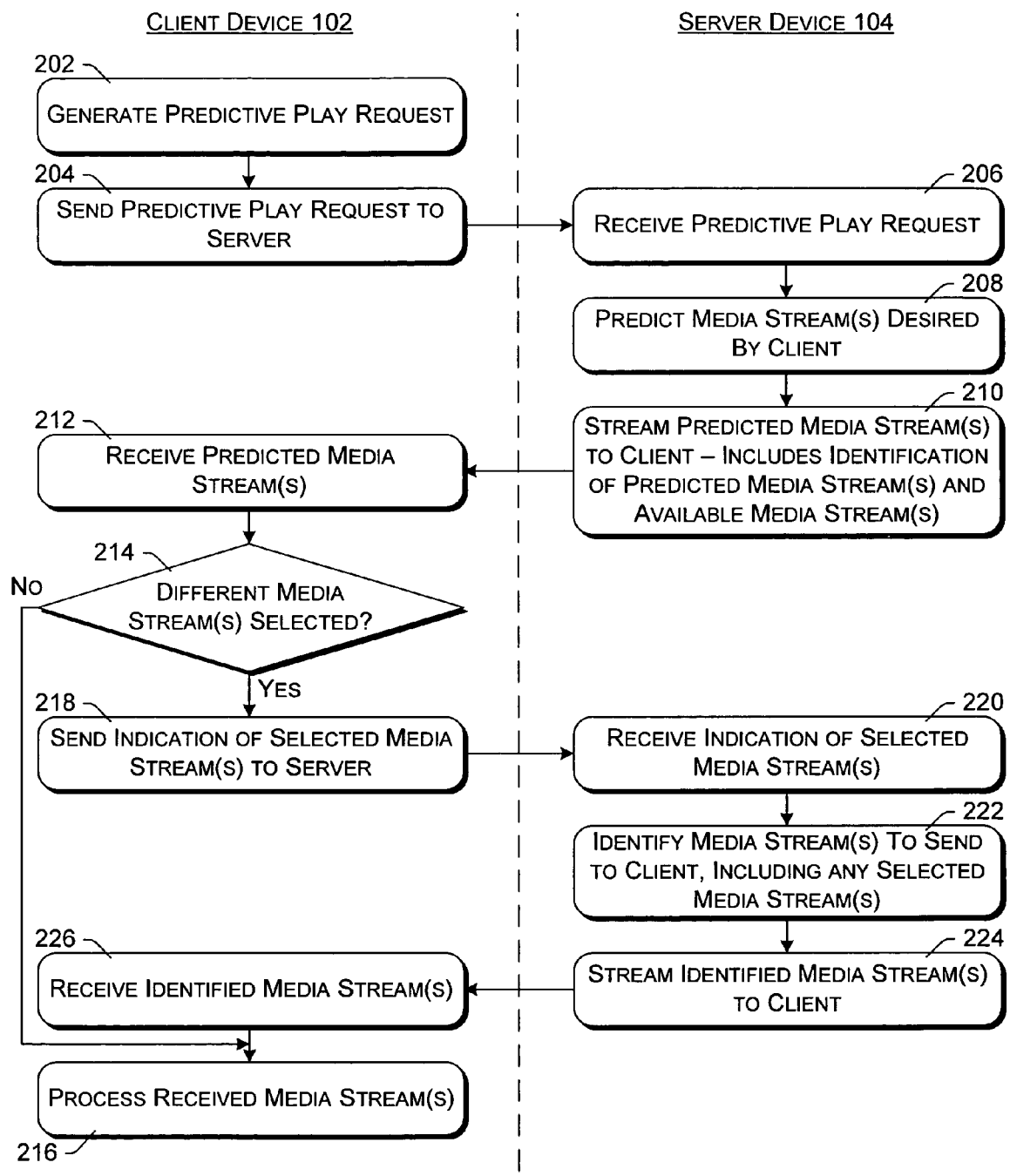
FIG. 4 is a flowchart illustrating an example predictive start process.

FIG. 4 is a flowchart illustrating an example predictive start process 200. FIG. 4 shows acts performed by both a client device 102 (e.g., of FIGS. 1, 2, and 3) and a server device 104 (e.g., of FIGS. 1, 2, and 3). Acts performed by client device 102 are shown on the left side of FIG. 4, while acts performed by server device 104 are shown on the right side of FIG. 4.

Initially, client device 102 generates a predictive play request (act 202). The predictive play request identifies one or more media or multimedia presentations, represented as a resource of server device 104, that is desired to be streamed to client device 102. Client device 102 sends the predictive play request to server device 104 (act 204), which receives the predictive play request (act 206).

In response to the predictive play request, server device 104 predicts one or more media stream(s) desired by the client device 102 (act 208). As discussed above, this prediction can be based on different factors, such as information included in the predictive play request, default settings at server device 104, information associated with the requested resource, previous requests for streaming media, and so forth. The predicted media stream(s) are then streamed to client device 102 (act 210). As part of this streaming in act 210, an identification of the predicted media stream(s) as well as the available media stream(s) for the requested resource is also sent to client device 102. Alternatively, as discussed above, the identification of the predicted media stream(s) as well as the available media stream(s) for the requested resource can be communicated to client device 102 in other manners, including non-streaming manners.

Client device 102 receives the predicted media stream(s) (act 212) and analyzes the received identification of the predicted media stream(s) as well as the available media stream(s) for the requested resource. Process 200 then proceeds based on whether client device 102 desires to have streamed to it one or more different media stream(s) than the predicted media stream(s). As discussed above, a selection of such a different media stream(s) can be made in different manners, such as by an application program on client device 102 or a user-input at client device 102. If a different media stream(s) is not selected (act 214), then client device 102 does desire the media stream(s) that server device 104 predicted and processing of those received media stream(s) continues (act 216). This processing can include, for example, buffering the received media stream(s) and/or presenting (e.g., playing back) the received media stream(s) at client device 102.

However, if different media stream(s) are selected, then client device 102 sends an indication of those selected media stream(s) to server device 104 (act 218). Server device 104 receives the indication of the selected media stream(s) (act 220), and identifies the media stream(s) to send to client device 102 (act 222). As discussed above, the stream(s) selected by client device 102 can be in addition to the predicted media stream(s), or in place of one or more of the predicted media stream(s). The media stream(s) identified by server device 104 in act 222 include the streams indicated as being selected by client device 102 (received in act 220), and may also include one or more of the stream(s) predicted by server device 104 in act 208.

Server device 104 then streams the identified media stream (s) streamed to client device 102 (act 224). Typically, the identified media stream(s) are streamed from the current playback position (e.g., when the selection request is received, the temporal location of the media stream(s) currently being streamed is identified, and then the corresponding temporal location of the identified media stream(s) is determined and streaming of the identified media stream(s) begins at that determined location). Alternatively, other starting points may be used, such as the beginning of the identified media stream(s). Client device 102 receives the identified media stream(s) from server device 104 (act 226), and processes the received media stream(s) (act 216). This processing can include, for example, buffering the media stream(s) and presenting (e.g., playing back) the media stream(s) at client device 102.

Returning to FIG. 2, the fast startup discussed herein also includes a process for switching delivery channel(s) during streaming. Transport protocol 152 can use a variety of different delivery channels. Typically, each media stream is sent from server device 104 to client device 102 using a different delivery channel. These delivery channels for different media streams are typically of the same type, although alternatively they can be of different types. Two common types of delivery channels are TCP channels and UDP channels. TCP channels transmit data in packets referred to as TCP packets, while UDP channels transmit data in packets referred to as UDP packets. Typically, delivery of data packets using TCP is more reliable, but also more time-consuming, than delivery of data packets using UDP. Additionally, situations can arise, such as where a firewall is located between client device 102 and server device 104, where UDP packets cannot be received by client device 102 but TCP packets can be received by client device 102.

Figure 5:
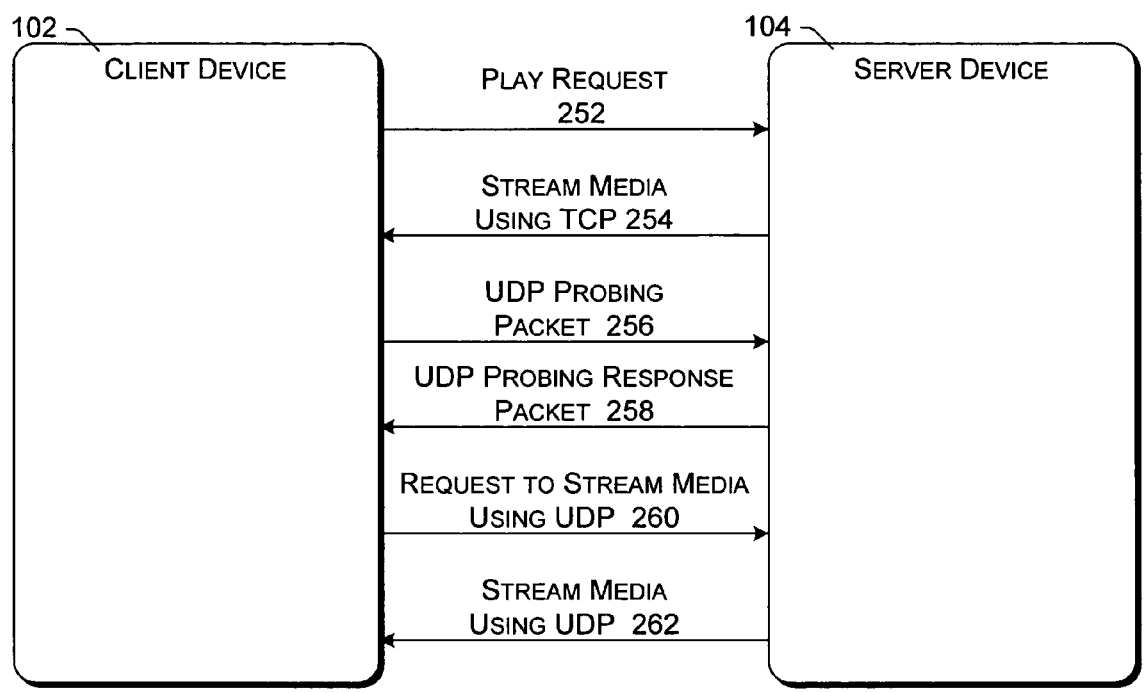
FIG. 5 is a block diagram illustrating example client and server devices and the delivery channel switching process in additional detail.

FIG. 5 is a block diagram illustrating example client and server devices and the delivery channel switching process in additional detail. In certain embodiments, the protocols 150, 152, and 154 of FIG. 2 are included in the client and server devices of FIG. 5, but have not been illustrated. Furthermore, although not shown in FIG. 5, one or more additional devices (e.g., firewalls, routers, gateways, bridges, etc.) may be situated between client device 102 and server device 104. The delivery channel switching discussed herein allows the media content source to begin streaming the media stream(s) using one delivery channel (e.g., TCP), and then check whether another delivery channel (e.g., UDP) will work and switch to that other delivery channel if it will work.

Initially, client device 102 sends a play request 252 to server device 104, requesting that one or more media streams be streamed to client device 102. This play request 252 can be a predictive play request as discussed above, or alternatively any other request (or combination of multiple requests) that requests that one or more media streams be streamed to client device 102. For example, this play request 252 could be an HTTP Post command with a Select request that identifies the desired media streams. In response to the play request, server device 104 streams 254 the requested media stream(s) to client device 102 using TCP. This response includes the data for the requested media stream(s) in multiple TCP packets.

While streaming the media from server device 104 to client device 102 using TCP, client device 102 sends a UDP probing packet 256 to server device 104. In certain embodiments, this is accomplished by server device 104 opening a UDP port and sending an identification of the opened UDP port to client device 102 along with the streaming media using TCP 254. Client device 102 receives the UDP port identification, and then can send a UDP packet to that port of server device 104. Alternatively, server device 104 may have a well-known UDP port to use for UDP probing packets, and client device 102 can send UDP probing packet 256 to this well-known UDP port without server device 104 first sending an identification of the opened UDP port to client device 102. Client device 102 also opens a UDP port that it can identify to server device 104, as part of UDP probing packet 256, as the UDP port on which it can receive UDP packets.

Server device 104 receives the UDP probing packet 256 and generates and sends a UDP probing response packet 258 to client device 102. UDP probing response packet 258 is an indication to client device 102 that UDP probing packet 256 was received by server device 104. UDP probing response packet 258 optionally includes some sort of identifier of UDP probing packet 256, such as an identifier included in UDP probing packet 256. Alternatively, the mere existence of a response over the same connection may itself associate the response packet 258 with the probing packet 256. For example, if a single request and associated response are the only two messages sent over a connection, then the response 258 will be viewed as the response to probing packet 256.

It should be noted that while in some embodiments a single UDP probing packet 256 is sent by client device 102, in other embodiments multiple UDP probing packets 256 are sent by client device 102 and a UDP probing response packet 258 is returned by server device 104 for each such UDP probing packet 256. The multiple UDP probing packets 256 may be sent by client device 102 concurrently, or alternatively at different times (e.g., client device 102 may wait for a UDP probing response packet 258 to be returned for one UDP probing packet 256 before sending another UDP probing packet 256). For example, in embodiments where transport protocol 152 includes the RTP and RTCP protocols, the RTP data is sent using one delivery channel or flow, and the RTCP data is sent using a different delivery channel or flow. A UDP probing packet 256 can be sent for each of these two delivery channels or flows. By way of another example, a different UDP probing packet 256 may be sent by client device 102 for each of multiple media streams (e.g., for each media stream that client device 102 would like to switch to streaming using UDP, for each media stream currently being streamed to client device 102 using TCP, and so forth). These two examples may also be combined (e.g., two UDP probing packets 256 (one for the RTP flow and the other for the RTCP flow) may be sent by client device 102 for each of multiple media streams).

When client device 102 receives the UDP probing response packet 258, client device 102 knows that UDP packets can be sent from server device 104 to client device 102. So, client device 102 sends a request to server device 104 to switch to streaming the media stream(s) from server device 104 to client device 102 using UDP 260. Typically, client device 102 sends a request to server device 104 that all of the media stream(s) be switched to being streamed using UDP, although alternatively client device 102 may identify in the request only particular media stream(s) that are to be switched to being streamed using UDP (with the remaining media stream (s) being still streamed using TCP). Alternatively, multiple requests may be sent from client device 102 to server device 104, each request identifying a particular one or more media streams that should be streamed to client device 102 using UDP.

In response to this request, server device 104 begins streaming the media stream(s) requested in play request 252 to client device 102 using UDP 262. In certain embodiments, because streaming of the media stream(s) using TCP has already begun, server device 104 does not start streaming using UDP at the beginning of the media stream(s). Rather, server device 104 stops streaming the data using TCP and starts streaming using UDP at whatever point the streaming using TCP was stopped. Alternatively, there may be some overlap between packets (e.g., at the point where the switch to UDP occurs, some packets already sent using TCP may be re-sent using UDP).

The request to switch to streaming the media stream(s) from server device 104 to client device 102 using UDP 260 can be in any of a variety of different formats. In certain embodiments, the request is a Select request, which can be sent as an HTTP Post command to server device 104. Alternatively, the request can be delivered in other manners, such as using an RTSP command. The Select request includes an identifier that identifies the request as a Select request, zero or more headers, and optionally a message body. In certain embodiments, the information requesting that the server device switch to streaming the media stream(s) using UDP is included in one or more headers of the Select request, although the information requesting that the server device switch to streaming the media stream(s) using UDP could alternatively be included in the message body, or alternatively the request to switch to streaming the media stream(s) using UDP could be inherent in the request. In certain implementations, the presence of a Pragma: stream-switch-entry header (discussed with reference to Table I) and/or an X-Transport header (discussed with reference to Table II) serves as the identifier that identifies the request as a Select request. Table II illustrates an example of headers that can be included in the Select request.

TABLE II

| Header Name | Description |
|---|---|
| Pragma: client-id | An identifier of the streaming media session. Allows the client device to indicate that the Select request is associated with a particular streaming session. |
| X-Transport | Used to indicate that the media stream(s) should be switched to being streamed using UDP. A parameter of "RTP/UDP transport" is used in certain implementations to indicate that the media stream(s) should be switched to being streamed using UDP. This header also typically includes a parameter that identifies which UDP port(s) that the client is using for receiving RTP and RTCP packets. |

In certain embodiments, control information (e.g., RTCP packets) are sent from server device 104 to client device 102 using TCP packets even if the data representing the actual content of the media streams (e.g., the data representing the video or audio that is played back at client device 102) is sent from server device 104 to client device 102 using UDP packets. In other embodiments, all data, including control information (e.g., RTCP packets) is sent from server device 104 to client device 102 using UDP packets.

It should be noted that if UDP packets cannot be used to stream data from server device 104 to client device 102, UDP probing packet 256 will not arrive at server device 104 (so server device 104 will never send UDP probing response packet 258), or UDP probing response packet 258 will not arrive at client device 102. So, if client device 102 does not receive a response to the UDP probing packet 256, client device 102 knows that UDP packets cannot be used to stream data from server device 104 to client device 102. Optionally, if client device 102 does not receive a response to the UDP probing packet 256, client device 102 may re-send UDP probing packet(s) one or more times to verify that UDP packets cannot be used to stream data from server device 104 to client device 102.

Additionally, it should be noted that in situations where multiple UDP probing packets 256 are sent (e.g., for multiple media streams or multiple flows), UDP probing response packets 258 may be received in response to some of the probing packets 256 but not others, indicating that UDP packets can be streamed from server device 104 to client device 102 for some streams or flows (those for which the UDP probing response packet 258 was received) but not for other streams or flows (those for which the UDP probing response packet was not received).

It should also be noted that the probing of whether UDP packets can be used to stream data from server device 104 to client device 102 occurs while the requested media stream(s) are being streamed to client device 102 using TCP 254. Thus, the client device 102 begins receiving the requested media stream(s) without having to wait for a determination of whether the data can be streamed to client device 102 using UDP packets.

It should be further noted that the UDP probing packet 256 and UDP probing response packet 258 can include any of a variety of information. Information about the media stream(s) need not be sent between client device 102 and server device 104 using the UDP probing packet 256 and UDP probing response packet 258. The importance of the UDP probing and UDP probing response packets is simply whether the packets arrive at their intended targets, rather than any particular information about the media stream(s) that is included in the packets.

Figure 6:
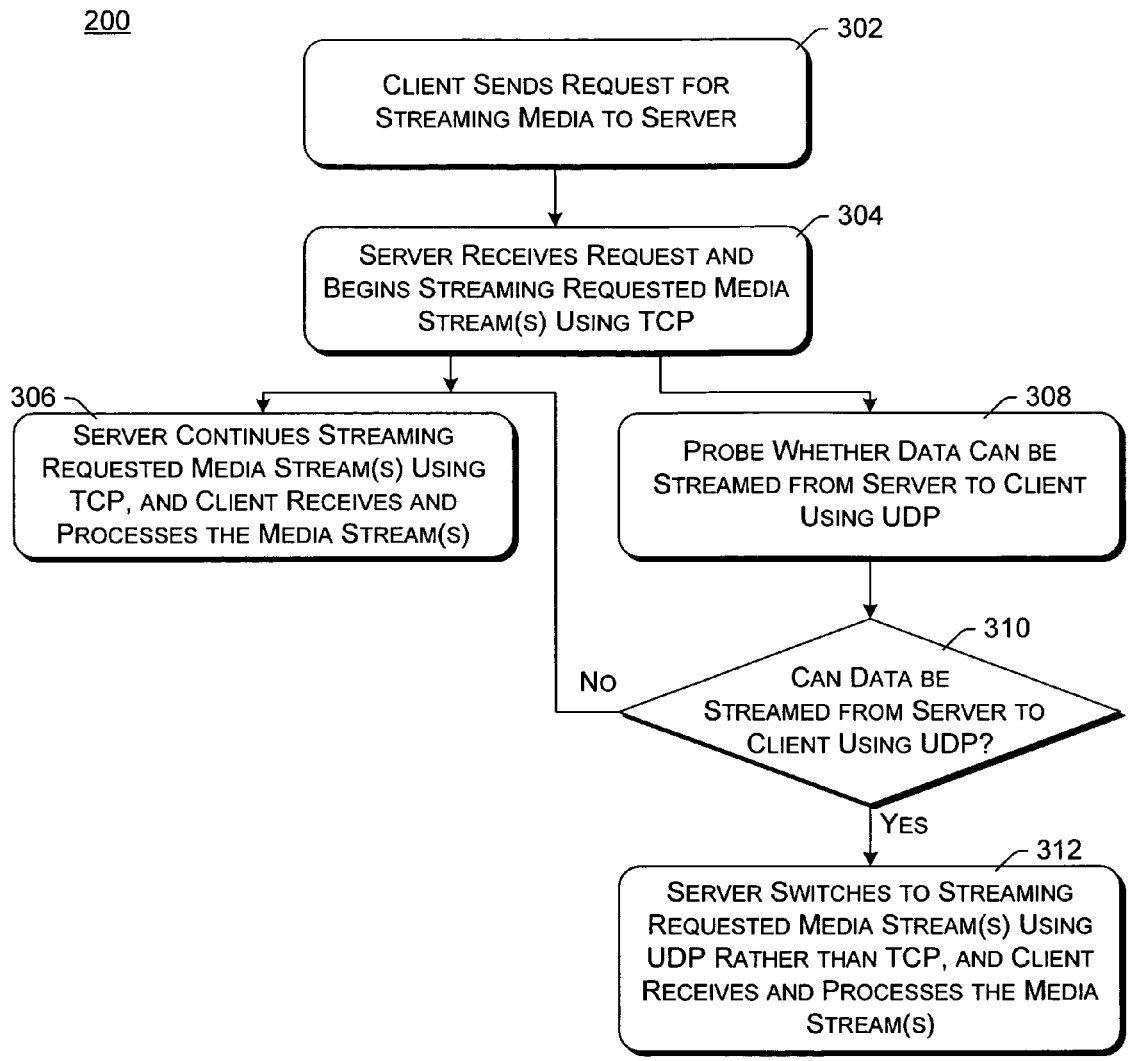
FIG. 6 is a flowchart illustrating an example delivery channel switching process.

FIG. 6 is a flowchart illustrating an example delivery channel switching process 300. FIG. 6 shows acts performed by both a client device 102 (e.g., of FIGS. 1, 2, and 5) and a server device 104 (e.g., of FIGS. 1, 2, and 5).

Initially, client device 102 sends a request for streaming media to a server device 104 (act 302). Server device 104 receives the request and begins streaming the requested media stream(s) to client device 102 using TCP (act 304). Server device 104 continues to stream the requested media stream(s) using TCP, and client device 102 receives and processes the media stream(s) (act 306). This processing can include, for example, buffering and/or presenting (e.g., playing back) the media stream(s) at client device 102.

Concurrent with the streaming of the requested media stream(s) using TCP in act 306, the link between client device 102 and server device 104 is probed to determine whether data can be streamed from server device 104 to client device 102 using UDP (act 308). As discussed above, this probing can involve information and packets sent between client device 102 and server device 104.

Process 300 then proceeds based on whether the probing indicates that data can be streamed from server device 104 to client device 102 using UDP (act 310). If data cannot be streamed from server device 104 to client device 102 using UDP, then server device 104 continues to stream the requested media stream(s) using TCP and client device 102 receives and processes the media stream(s) received using TCP (act 306). However, if data can be streamed from server device 104 to client device 102 using UDP, then server device 104 switches to streaming the requested media stream(s) using UDP rather than TCP, and client device 102 receives and processes the media stream(s) received using UDP (act 312). Typically, server device 104 switches to streaming the requested media stream(s) using UDP rather than TCP in response to a request (e.g., a Select request) sent from client device 102 requesting the switch to UDP. Additionally, it should be noted that not all streams need to be switched to streaming using UDP. Rather, client device 102 may request that only a particular one or more media streams be switched to streaming using UDP, and that one or more other media streams remain being streamed using TCP.

The fast startup described herein can include the predictive start technique and/or the delivery channel switching technique. FIGS. 3 and 4 above discuss example embodiments of the predictive start technique. FIGS. 5 and 6 above discuss example embodiments of the delivery channel switching technique.

Figure 7:
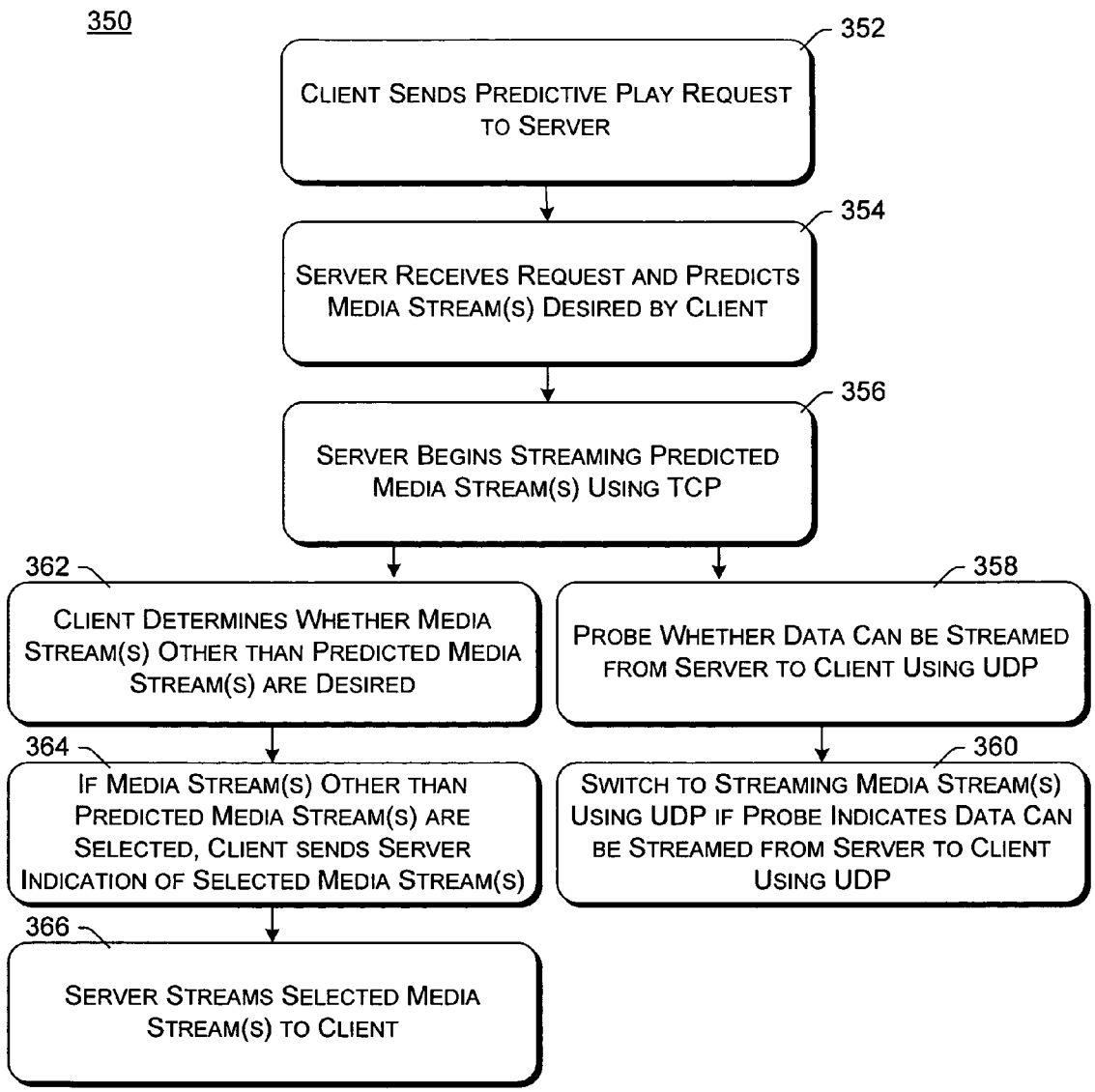
FIG. 7 is a flowchart illustrating an example fast startup process including both predictive start and delivery channel switching.

FIG. 7 is a flowchart illustrating an example fast startup process 350 including both predictive start and delivery channel switching. FIG. 7 shows acts performed by both a client device 102 (e.g., of FIGS. 1, 2, and 5) and a server device 104 (e.g., of FIGS. 1, 2, and 5).

Initially, client device 102 sends a predictive play request to server device 104 (act 352). Server device 104 receives the predictive play request and predicts the media stream(s) desired by client device 102 (act 354). Server device 104 then begins streaming the predicted media stream(s) to client device 102 using TCP (act 356).

The link between client device 102 and server device 104 is then probed to determine whether data can be streamed from server device 104 to client device 102 using UDP (act 358). If the probing indicates that data can be streamed from server device 104 to client device 102 using UDP, then server device 104 switches to streaming the media stream(s) using UDP rather than TCP (act 360); otherwise, server device 104 continues streaming the media stream(s) using TCP. Typically, server device 104 switches to streaming the requested media stream(s) using UDP rather than TCP in response to a request (e.g., a Select request) sent from client device 102 requesting the switch to UDP. Additionally, it should be noted that not all streams need to be switched to streaming using UDP. Rather, client device 102 may request that only a particular one or more media streams be switched to streaming using UDP, and that one or more other media streams remain being streamed using TCP.

Additionally, after streaming of the predicted media stream(s) using TCP has begun in act 356, client device 102 determines whether it desires media stream(s) other than the predicted media stream(s) (act 362). If so, then one or more media streams other than then predicted media stream(s) are selected (in addition to and/or in place of the predicted media streams), and client device 102 sends server device 104 an indication of the selected media stream(s) (act 364). Server device 104 receives this indication from client device 102 and streams the selected media stream(s) to client device 102 (act 366).

It should be noted that the media stream(s) being streamed in act 360 can include media stream(s) predicted in act 354 and/or media stream(s) selected in act 364. Whether the media stream(s) being streamed in act 360 are media stream(s) predicted in act 354 and/or media stream(s) selected in act 364 will depend on whether any media stream(s) are selected in act 364, as well as whether server 104 begins streaming any selected media stream(s) in act 366 prior to or subsequent to the switch of act 360.

In certain embodiments, the delivery channel switching of acts 358 and 360 is performed concurrently with the media stream selection of acts 362, 364, and 366. In other embodiments, the delivery channel switching of acts 358 and 360 can be performed subsequent to, or alternatively prior to, the media stream selection of acts 362, 364, and 366.

Figure 8:
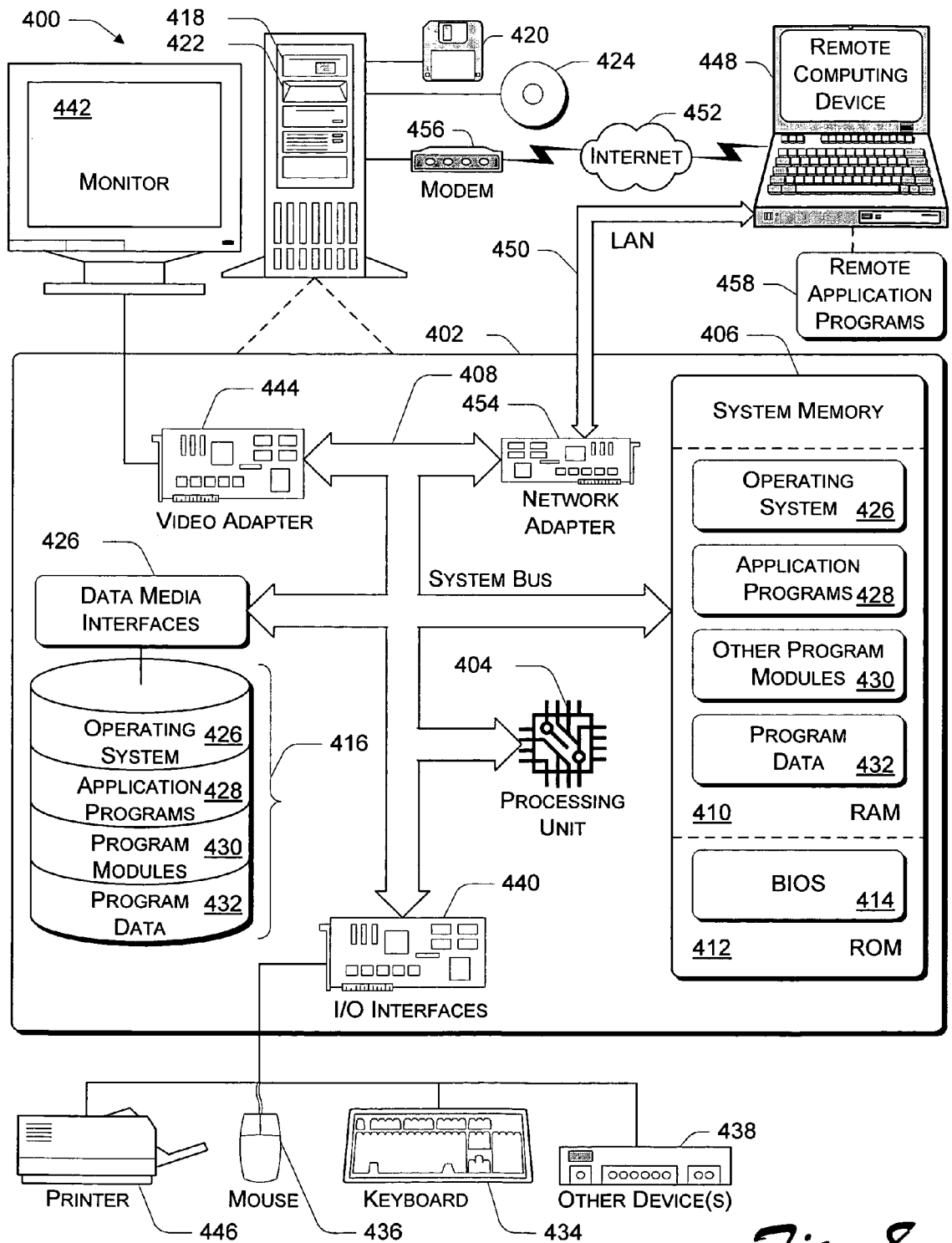
FIG. 8 illustrates a general computer environment, which can be used to implement the techniques described herein.

FIG. 8 illustrates a general computer environment 400, which can be used to implement the techniques described herein. The computer environment 400 is only one example of a computing environment and is not intended to suggest any limitation as to the scope of use or functionality of the computer and network architectures. Neither should the computer environment 400 be interpreted as having any dependency or requirement relating to any one or combination of components illustrated in the exemplary computer environment 400.

Computer environment 400 includes a general-purpose computing device in the form of a computer 402. Computer 402 can be, for example, a client device 102 or server device 104 of FIGS. 1, 2, 3, and 5. Computer 402 can also be an encoder device that is the source of a multimedia presentation. The components of computer 402 can include, but are not limited to, one or more processors or processing units 404, a system memory 406, and a system bus 408 that couples various system components including the processor 404 to the system memory 406.

The system bus 408 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 402 typically includes a variety of computer readable media. Such media can be any available media that is accessible by computer 402 and includes both volatile and non-volatile media, removable and non-removable media.

The system memory 406 includes computer readable media in the form of volatile memory, such as random access memory (RAM) 410, and/or non-volatile memory, such as read only memory (ROM) 412. A basic input/output system (BIOS) 414, containing the basic routines that help to transfer information between elements within computer 402, such as during start-up, is stored in ROM 412. RAM 410 typically contains data and/or program modules that are immediately accessible to and/or presently operated on by the processing unit 404.

Computer 402 may also include other removable/non-removable, volatile/non-volatile computer storage media. By way of example, FIG. 8 illustrates a hard disk drive 416 for reading from and writing to a non-removable, non-volatile magnetic media (not shown), a magnetic disk drive 418 for reading from and writing to a removable, non-volatile magnetic disk 420 (e.g., a "floppy disk"), and an optical disk drive 422 for reading from and/or writing to a removable, non-volatile optical disk 424 such as a CD-ROM, DVD-ROM, or other optical media. The hard disk drive 416, magnetic disk drive 418, and optical disk drive 422 are each connected to the system bus 408 by one or more data media interfaces 426. Alternatively, the hard disk drive 416, magnetic disk drive 418, and optical disk drive 422 can be connected to the system bus 408 by one or more interfaces (not shown).

The disk drives and their associated computer-readable media provide non-volatile storage of computer readable instructions, data structures, program modules, and other data for computer 402. Although the example illustrates a hard disk 416, a removable magnetic disk 420, and a removable optical disk 424, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 416, magnetic disk 420, optical disk 424, ROM 412, and/or RAM 410, including by way of example, an operating system 426, one or more application programs 428, other program modules 430, and program data 432. Each of such operating system 426, one or more application programs 428, other program modules 430, and program data 432 (or some combination thereof) may implement all or part of the resident components that support the distributed file system.

A user can enter commands and information into computer 402 via input devices such as a keyboard 434 and a pointing device 436 (e.g., a "mouse"). Other input devices 438 (not shown specifically) may include a microphone, joystick, game pad, satellite dish, serial port, scanner, and/or the like. These and other input devices are connected to the processing unit 404 via input/output interfaces 440 that are coupled to the system bus 408, but may be connected by other interface and bus structures, such as a parallel port, game port, or a universal serial bus (USB).

A monitor 442 or other type of display device can also be connected to the system bus 408 via an interface, such as a video adapter 444. In addition to the monitor 442, other output peripheral devices can include components such as speakers (not shown) and a printer 446 which can be connected to computer 402 via the input/output interfaces 440.

Computer 402 can operate in a networked environment using logical connections to one or more remote computers, such as a remote computing device 448. By way of example, the remote computing device 448 can be a personal computer, portable computer, a server, a router, a network computer, a peer device or other common network node, and the like. The remote computing device 448 is illustrated as a portable computer that can include many or all of the elements and features described herein relative to computer 402.

Logical connections between computer 402 and the remote computer 448 are depicted as a local area network (LAN) 450 and a general wide area network (WAN) 452. Such networking environments are commonplace in offices, enterprise-wide computer networks, intranets, and the Internet.

When implemented in a LAN networking environment, the computer 402 is connected to a local network 450 via a network interface or adapter 454. When implemented in a WAN networking environment, the computer 402 typically includes a modem 456 or other means for establishing communications over the wide network 452. The modem 456, which can be internal or external to computer 402, can be connected to the system bus 408 via the input/output interfaces 440 or other appropriate mechanisms. It is to be appreciated that the illustrated network connections are exemplary and that other means of establishing communication link(s) between the computers 402 and 448 can be employed.

In a networked environment, such as that illustrated with computing environment 400, program modules depicted relative to the computer 402, or portions thereof, may be stored in a remote memory storage device. By way of example, remote application programs 458 reside on a memory device of remote computer 448. For purposes of illustration, application programs and other executable program components such as the operating system are illustrated herein as discrete blocks, although it is recognized that such programs and components reside at various times in different storage components of the computing device 402, and are executed by the data processor(s) of the computer.

Various modules and techniques may be described herein in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise "computer storage media" and "communications media."

"Computer storage media" includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

The invention claimed is:

1. A method, comprising:

receiving, at a server device, a predictive play request, from a client device, the predictive play request including information about the client device, information about a client using the client device, and information about a connection between the client device and the server device;

predicting, at the server device and in response to the predictive play request, one or more media streams desired by the client device;

streaming at least the predicted one or more media streams from the server device to the client device;

choosing, by the server device, not to predict one or more media streams to be streamed to the client device when a likelihood of making an incorrect prediction exceeds a predetermined threshold and communicating, to the client device, an identification of one or more available media streams that can be streamed to the client device without streaming the one or more available media streams, the one or more available media streams being streamed to the client device at a request of the client device;

receiving a determination, from the client device, of whether at least one media stream different from the predicted one or more media streams are selected for streaming to the client device;

if the at least one media stream different from the predicted one or more media streams are selected for streaming to the client device, then receiving, from the client device, an indication of the selected at least one media stream;

streaming the one or more media streams from the server device to the client device using TCP (Transmission Control Protocol);

in response to probing to determine whether data can be streamed from the server device to the client device using UDP (User Datagram Protocol), switching to streaming the one or more media streams from the server device to the client device using UDP when the probing indicates that data can be streamed from the server device to the client device using UDP;

wherein the probing includes:

receiving, by the server device, a UDP probing packet from the client device;

sending, by the server device, a UDP probing response packet to the client device, to indicate to the client device that the UDP probing packet was received by the server device, when the server device can stream data to client device using UDP; and receiving, by the server device, additional UDP probing packets from the client device to verify that data cannot be streamed from the server device to the client device using UDP when the client device determines that the server device did not receive the UDP probing packet;

continuing to stream the one or more media streams from the server device to the client device using TCP when the probing indicates that data cannot be streamed from the server device to the client device using UDP.

2. A method as recited in claim 1, wherein the probing comprises:

receiving from the client device one or more UDP probing packets;

sending, in response to each of the one or more UDP probing packets, a UDP response packet from the server device to the client device;

determining, if at least one of the UDP response packets is received by the client device, that at least some data can be streamed from the server device to the client device using UDP; and determining, if none of the UDP response packets are received by the client device, that data cannot be streamed from the server device to the client device using UDP.

3. One or more computer readable storage media having stored thereon a plurality of instructions that, when executed by one or more processors, causes the one or more processors to:

receive, from a requestor, a predictive play request for media content to be streamed to the requestor, the predictive play request including information about the requestor and information about a connection to the requestor;

predicting, in response to the predictive play request, one or more media streams desired by the requestor;

streaming, using Transmission Control Protocol (TCP) packets, at least the predicted one or more media streams to the requestor;

choosing not to predict one or more media streams to be streamed to the requestor when a likelihood of making an incorrect prediction exceeds a predetermined threshold and communicating, to the requestor, an identification of one or more available media streams that can be streamed to the requestor without streaming the one or more available media streams, the one or more available media streams being streamed to the requestor at a request of the requestor;

receiving a determination, from the requestor, of whether at least one media stream different from the predicted one or more media streams are selected for streaming to the requestor;

if the at least one media stream different from the predicted one or more media streams are selected for streaming to the requestor, then receiving, from the requestor, an indication of the selected at least one media stream;

receive, concurrent with the at least a portion of the content being streamed to the requestor, a request to change to using User Datagram Protocol (UDP) packets; and stream one or more additional portions of the media content to the requestor using UDP packets rather than TCP packets, wherein the request to change to using UDP packets is received after receiving probing to determine whether media content can be streamed to the requestor using UDP packets and a determination has been made that media content can be streamed to the requestor using UDP packets, the probing occurring while the at least a portion of the media content is being streamed to the requestor using TCP packets, and wherein the probing includes receiving a UDP probing packet from the requestor and sending a UDP probing response packet to the requestor, to indicate to the requestor that the UDP probing packet was received, when it is determined that the UDP packets can be streamed to the requestor.

4. One or more computer readable storage media as recited in claim 3, the one or more additional portions of the media content streamed to the requestor using UDP packets including none of the at least a portion of the media content streamed to the requestor using TCP packets.

5. One or more computer readable storage media as recited in claim 3, wherein the instructions further cause the one or more processors to:

send, after receipt of the request to change to using UDP packets, data representing control information to the requestor using TCP packets.

6. One or more computer readable storage media as recited in claim 3, wherein the instructions that cause the one or more processors to stream the one or more additional portions of the media content to the requestor using UDP packets rather than TCP packets comprise instructions that cause the one or more processors to stream one or more additional portions of only selected media streams of the media content to the requestor using UDP packets rather than TCP packets.

7. One or more computer readable storage media as recited in claim 3, wherein the request to change to using UDP packets comprises a Select request having one or more headers to indicate that the media content is to be streamed to the requestor using UDP packets.

8. One or more computer readable storage media as recited in claim 7, wherein the one or more headers comprises an X-Transport header with an RTP/UDP transport parameter.

9. One or more computer readable storage media as recited in claim 3, wherein the requestor comprises a client device.

10. One or more computer readable storage media as recited in claim 3, wherein the one or more processors are part of a server device.

11. One or more computer readable storage media having stored thereon a plurality of instructions that, when executed by one or more processors of a device, causes the one or more processors to:

send, from the device to a media content source, a predictive play request, the predictive play request including information about the device, information about a client using the device, and information about a connection between the device and the media content source;

receiving, at the device, at least a portion of media content predicted by the media content source to be desired by the device;

receiving, at the device, an identification of one or more available media streams that can be streamed to the device without streaming the one or more available media streams, the one or more available media streams being streamed to the device at a request of the device, wherein the media content source chooses to not predict one or more media streams to be streamed to the device when a likelihood of making an incorrect prediction exceeds a predetermined threshold;

communicating, by the device, whether at least one media stream different from the predicted one or more media streams are selected for streaming to the device;

if the at least one media stream different from the predicted one or more media streams are selected for streaming to the device, then transmitting, from the device, an indication of the selected at least one media stream;

receive, from the media content source, at least a portion of media content using Transmission Control Protocol (TCP) packets;

send probing to determine, during receipt of the at least a portion of the media content using TCP packets, whether the media content can be streamed to the device using User Datagram Protocol (UDP) packets, wherein the send probing including sending a UDP probing packet to the media content source;

send, if the device receives a probing response from the media content source indicating that the media content can be streamed to the device using UDP packets, a request to the media content source to stream the media content to the device using UDP packets, wherein the receiving the probing response includes receiving a UDP probing response packet, to indicate that the UDP probing packet was received, when it is determined that the media content source can stream UDP packets; and send additional UDP probing packets to the media content source to verify that data cannot be streamed from the media content source using UDP when it is determined that the media content source did not receive the UDP probing packet.

12. One or more computer readable storage media as recited in claim 11, wherein the instructions further cause the one or more processors to:

receive, after having sent the request, data representing the media content using UDP packets and data representing control information using TCP packets.

13. One or more computer readable storage media as recited in claim 11, wherein the instructions that cause the one or more processors to send the request to the media content source comprise instructions that cause the one or more processors to send a request to the media content source to stream only selected media streams of the media content to the device using UDP packets.

14. One or more computer readable storage media as recited in claim 11, wherein the instructions that cause the one or more processors to determine whether the media content can be streamed to the device using UDP packets comprise instructions that cause the one or more processors to:

send, to the media content source, a UDP probing packet; and determine, if a UDP response packet is received from the media content source in response to the UDP probing packet, whether media content can be streamed to the device using UDP packets, and otherwise determine whether media content cannot be streamed to the device using UDP packets.

15. One or more computer readable storage media as recited in claim 11, wherein the media content source comprises a server device.

16. One or more computer readable storage media as recited in claim 11, wherein the request comprises a Select request having an X-Transport header with an RTP/UDP transport parameter to indicate that the media content is to be streamed to the device using UDP packets.

17. One or more computer readable storage media as recited in claim 11, wherein the request comprises a HyperText Transport Protocol (HTTP) Post command.

18. One or more computer readable storage media as recited in claim 11, wherein the request comprises a HyperText Transport Protocol (HTTP) Get command.

19. One or more computer readable storage media having stored thereon a plurality of instructions that, when executed by one or more processors of a device, causes the one or more processors to:

receive a predictive play request from a requestor, the predictive play request including information about the requestor device, information about the requestor, and information about a connection between the requestor device and a server device;

predict, in response to the predictive play request, one or more media streams to be streamed to the requestor;

stream the predicted one or more media streams to the requestor;

communicate, to the requestor, an identification of the predicted one or more streams as well as an identification of one or more additional streams that are streamed to the requestor when requested by the requestor;

choose not to predict one or more media streams to be streamed to the requestor when a likelihood of making an incorrect prediction exceeds a predetermined threshold and communicating, to the requestor, an identification of one or more available media streams that can be streamed to the requestor without streaming the one or more available media streams, the one or more available media streams being streamed to the requestor at a request of the requestor;

receive a second request from the requestor requesting one or more selected streams if the requestor determines that the predicted one or more media streams streamed to the requestor are not desired by the requestor;

identify and stream to the requestor, using Transmission Control Protocol (TCP), one or more streams that are capable of either replacing the predicted one or more streams and are able to be streamed in addition to the predicted one or more streams;

in response to probing to determine whether data can be streamed from the server device to the requestor using User Diagram Protocol (UDP), switching to streaming the one or more media streams from the server device to the requestor using UDP when the probing indicates that data can be streamed from the server device to the requestor using UDP;

wherein the probing includes receiving, by the server device, a UDP probing packet from the requestor and sending, by the server device, a UDP probing response packet to the requestor, to indicate to the requestor that the UDP probing packet was received, when the server device determines that the UDP packets can be streamed to the requestor;

continuing to stream the one or more media streams from the server device to the requestor device using TCP when the probing indicates that data cannot be streamed from the server device to the requestor device using UDP;

stop streaming the predicted one or more streams when the identified one or more streams are to replace the predicted one or more streams; and continue streaming the predicted one or more streams when the identified one or more streams are to be in addition to the predicted one or more streams.

20. One or more computer readable storage media as recited in claim 19, wherein the predictive play request comprises a request having a "Pragma: PredStart=1" header.

21. One or more computer readable storage media as recited in claim 19, wherein the instructions further cause the one or more processors to:

receive, from the requestor, a request to stream a different media stream other than one of the predicted one or more media streams;

stop streaming the one of the predicted one or more media streams to the requestor; and begin streaming the different media stream to the requestor.

22. One or more computer readable storage media as recited in claim 21, wherein the request to stream a different media stream other than one of the predicted one or more media streams comprises a Select request having a "pragma: stream-switch-entry" header with one or more parameters to indicate the different media stream.

23. One or more computer readable storage media as recited in claim 19, wherein the requestor comprises a client device.

24. One or more computer readable storage media as recited in claim 19, wherein the instructions that cause the one or more processors to predict one or more media streams to be streamed to the requestor comprise instructions that cause the one or more processors to predict the one or more media streams to be streamed to the requestor based at least in part on information included in the predictive play request.

25. One or more computer readable storage media as recited in claim 24, wherein the information included in the predictive play request comprises an identification of a connection speed between the requestor and the device.

26. One or more computer readable storage media as recited in claim 24, wherein the information included in the predictive play request comprises an identification of a language desired by the requestor.

27. One or more computer readable storage media as recited in claim 19, wherein the instructions that cause the one or more processors to predict one or more media streams to be streamed to the requestor comprise instructions that cause the one or more processors to predict the one or more media streams to be streamed to the requestor based at least in part on information, other than information included in the predictive play request, available to the device.

28. One or more computer readable storage media having stored thereon a plurality of instructions that, when executed by one or more processors of a device, causes the one or more processors to:

send a predictive play request to a media content source, the predictive play request including information about the device, information about a user of the device, and information about a connection between the device and the media content source;

receive, in response to the predictive play request, one or more media streams predicted by the media content source as being desired by the device; and receive a communication, from the media content source, identifying the predicted one or more streams as well as an identification of one or more additional streams that are streamed to the requestor when requested by the requestor;

receive a communication, from the media content source, identifying one or more available media streams that can be streamed from the media content source but that are not streamed unless requested when it is determined that a likelihood of receiving an incorrect prediction exceeds a predetermined threshold;

send a second request, to the media content source, requesting one or more selected streams if it is determined that the predicted one or more media streams are not desired;

receive, using Transmission Control Protocol (TCP), one or more streams identified by the media content source that are capable of either replacing the predicted one or more streams and are able to be streamed in addition to the predicted one or more streams;

in response to probing to determine whether data can be streamed from the media content source to the device using User Diagram Protocol (UDP), receiving the one or more media streams from the media content device to the device using UDP when the probing indicates that data can be streamed from the media content source to the device using UDP;

wherein the probing includes sending, by the device, a UDP probing packet to the media content source and receiving, by the device, a UDP probing response packet to indicate to the device that the UDP probing packet was received when the media content source determines that the UDP packets can be streamed to the device;

stop receiving the predicted one or more streams when the identified one or more streams are to replace the predicted one or more streams; and continue to receive the predicted one or more streams when the identified one or more streams are to be in addition to the predicted one or more streams.

29. One or more computer readable storage media as recited in claim 28, wherein the predictive play request comprises a request having a "Pragma: PredStart=1" header.

30. One or more computer readable storage media as recited in claim 28, wherein the instructions that cause the one or more processors to receive one or more media streams predicted by the media content source as being desired by the device cause the one or more processors to receive the one or more media streams predicted by the media content source as being desired by the device without the device having selected any of the one or more media streams.

31. One or more computer readable storage media as recited in claim 28, wherein the instructions further cause the one or more processors to:
  select a different media stream than one of the one or more media streams predicted by the media content source as being desired by the device;
  send, to the media content source, an indication of the different media stream; and
  receive, in response to the indication and from the media content source, the different media stream in place of the one of the one or more media streams predicted by the media content source as being desired by the device.

32. One or more computer readable storage media as recited in claim 31, wherein the indication of the different media stream comprises a Select request having a "pragma: stream-switch-entry" header with one or more parameters to indicate the different media stream.

33. One or more computer readable storage media as recited in claim 28, wherein the instructions further cause the one or more processors to:
  select a different media stream than the one or more media streams predicted by the media content source as being desired by the device;
  send, to the media content source, an indication of the different media stream; and
  receive, in response to the indication and from the media content source, the different media stream in addition to the one or more media streams predicted by the media content source as being desired by the device.

34. One or more computer readable storage media as recited in claim 33, wherein the indication of the different media stream comprises a Select request having a "pragma: stream-switch-entry" header with one or more parameters to indicate the different media stream.

35. One or more computer readable storage media as recited in claim 28, wherein the instructions further cause the one or more processors to include, in the predictive play request, information to be used by the media content source in predicting the one or more media streams.

36. One or more computer readable storage media as recited in claim 35, wherein the information included in the predictive play request comprises an identification of a connection speed between the device and the media content source.

37. One or more computer readable storage media as recited in claim 35, wherein the information included in the predictive play request comprises an identification of a language desired by the device.

38. A method, comprising:
  receiving, at a server device, a predictive play request from a client device, the predictive play request including information about the client device, information about a client using the client device, and information about a connection between the client device and the server device;
  predicting, at the server device and in response to the predictive play request, one or more media streams desired by the client device;
  streaming at least the predicted one or more media streams from the server device to the client device;
  choosing, by the server device, not to predict one or more media streams to be streamed to the client device when a likelihood of making an incorrect prediction exceeds a predetermined threshold and communicating, to the client device, an identification of one or more available media streams that can be streamed to the client device without streaming the one or more available media streams, the one or more available media streams being streamed to the client device at a request of the client device;
  receiving a determination, from the client device, of whether at least one media stream different from the predicted one or more media streams are selected for streaming to the client device;
  if the at least one media stream different from the predicted one or more media streams are selected for streaming to the client device, then receiving, from the client device, an indication of the selected at least one media stream;
  streaming, using TCP (Transmission Control Protocol), from the server device to the client device the selected at least one media stream rather than at least one of the predicted one or more media streams;
  in response to probing to determine whether data can be streamed from the server device to the client device using UDP (User Datagram Protocol), switching to streaming the one or more media streams from the server device to the client device using UDP when the probing indicates that data can be streamed from the server device to the client device using UDP;
    wherein the probing includes receiving, by the server device, a UDP probing packet from the client device and sending, by the server device, a UDP probing response packet to the client device, to indicate to the client device that the UDP probing packet was received, when the server device determines that the UDP packets can be streamed to the client device,
  continuing to stream the one or more media streams from the server device to the client device using TCP when the probing indicates that data cannot be streamed from the server device to the client device using UDP.

* * * * *